(12) United States Patent
Wu

(10) Patent No.: US 10,820,367 B2
(45) Date of Patent: Oct. 27, 2020

(54) DEVICE AND METHOD OF HANDLING A RADIO RESOURCE CONTROL CONNECTION

(71) Applicant: HTC Corporation, Taoyuan (TW)

(72) Inventor: Chih-Hsiang Wu, Taoyuan (TW)

(73) Assignee: HTC Corporation, Taoyuan (TW)

( * ) Notice: Subject to any disclaimer, the term of this patent is extended or adjusted under 35 U.S.C. 154(b) by 0 days.

(21) Appl. No.: 16/274,111

(22) Filed: Feb. 12, 2019

(65) Prior Publication Data
US 2019/0254106 A1    Aug. 15, 2019

Related U.S. Application Data

(60) Provisional application No. 62/630,204, filed on Feb. 13, 2018, provisional application No. 62/664,284, filed on Apr. 30, 2018.

(51) Int. Cl.
| | |
|---|---|
| *H04W 76/27* | (2018.01) |
| *H04L 27/26* | (2006.01) |
| *H04W 52/02* | (2009.01) |
| *H04W 72/12* | (2009.01) |

(52) U.S. Cl.
CPC ......... *H04W 76/27* (2018.02); *H04L 27/2666* (2013.01); *H04W 52/0235* (2013.01); *H04W 72/1294* (2013.01)

(58) Field of Classification Search
CPC ....... H04L 1/18; H04L 5/0092; H04L 5/0094; H04L 27/2666; H04L 27/2673; H04W 52/0235; H04W 72/04; H04W 72/12; H04W 72/1294; H04W 76/04; H04W 76/27; H04W 88/06; H04W 56/001; H04W 72/0453
See application file for complete search history.

(56) References Cited

U.S. PATENT DOCUMENTS

| | | | |
|---|---|---|---|
| 9,906,991 B1* | 2/2018 | Peddiraju | H04W 36/26 |
| 2014/0348094 A1* | 11/2014 | Charbit | H04W 56/001 |
| | | | 370/329 |
| 2020/0252934 A1* | 8/2020 | Xue | H04W 72/0453 |

* cited by examiner

*Primary Examiner* — Khoa Huynh
(74) *Attorney, Agent, or Firm* — Winston Hsu

(57) ABSTRACT

A base station (BS) for handling a radio resource control (RRC) connection comprises at least one storage device and at least one processing circuit coupled to the at least one storage device, wherein the at least one storage device stores instructions, and the at least one processing circuit is configured to execute the instructions of: transmitting a first RRC message to a first communication device, wherein the first RRC message configures the first communication device to enter an IDLE state or an INACTIVE state and comprises a first Absolute Radio Frequency Channel Number (ARFCN) indicating a location of at least one synchronization signal block (SSB) at a first carrier, and the first RRC message indicates a subcarrier spacing.

12 Claims, 5 Drawing Sheets

DEVICE AND METHOD OF HANDLING A RADIO RESOURCE CONTROL CONNECTION

CROSS REFERENCE TO RELATED APPLICATIONS

This application claims the benefit of U.S. Provisional Applications No. 62/630,204, filed on Feb. 13, 2018, and No. 62/664,284, filed on Apr. 30, 2018, which are incorporated herein by reference.

BACKGROUND OF THE INVENTION

1. Field of the Invention

The present invention relates to a device and a method used in a wireless communication system, and more particularly, to a device and a method of handling a radio resource control connection.

2. Description of the Prior Art

In long-term evolution (LTE), only a single subcarrier spacing (SCS) (i.e., 15 KHz) is supported. To support a variety of numerologies, there are multiple SCSs defined in new radio (NR). However the multiple SCSs bring some issue.

SUMMARY OF THE INVENTION

The present invention therefore provides a method and related communication device for handling a radio resource control (RRC) connection to solve the abovementioned problem.

A base station (BS) for handling a radio resource control (RRC) connection comprises at least one storage device and at least one processing circuit coupled to the at least one storage device. The at least one storage device stores instructions, and the at least one processing circuit is configured to execute the instructions of: transmitting a first RRC message to a first communication device, wherein the first RRC message configures the first communication device to enter an IDLE state or an INACTIVE state and comprises a first Absolute Radio Frequency Channel Number (ARFCN) indicating a location of at least one synchronization signal block (SSB) at a first carrier, and the first RRC message indicates a subcarrier spacing.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
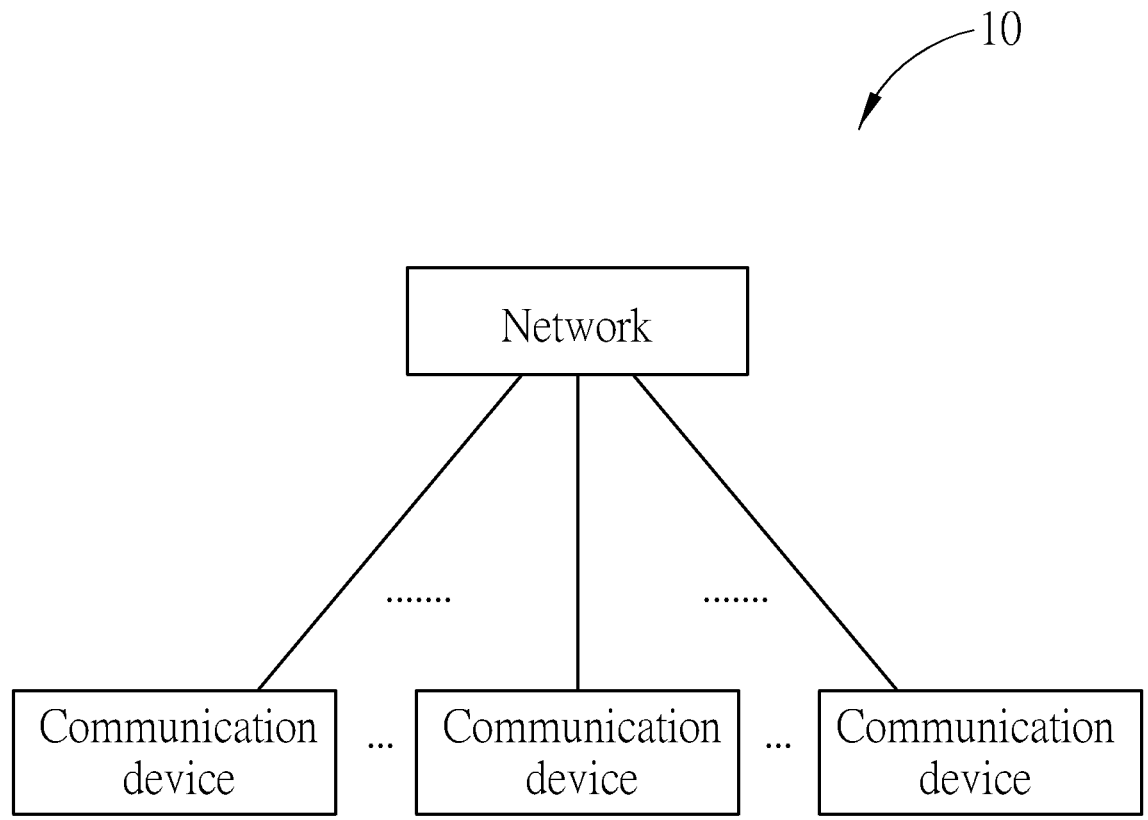
FIG. 1 is a schematic diagram of a wireless communication system according to an example of the present invention.

In FIG. 1, a wireless communication system 10 is briefly composed of a network and a plurality of communication devices. The network and a communication device may communicate with each other via one or more carriers. The network and the communication device may communicate with each other via one or multiple cells (e.g., multiple carriers) belonging to one or multiple base stations (BSs).

In FIG. 1, the network and the communication devices are simply utilized for illustrating the structure of the wireless communication system 10. The network includes a radio access network (RAN) and a core network. The RAN includes at least one base station (BS). In one example, the RAN may be an Evolved Universal Terrestrial RAN (EUTRAN), a next generation (NG) RAN (or called 5G RAN) or an evolved NG-RAN or a sixth generation (6G) RAN. In one example, the core network may be an evolved packet core (EPC), a 5G core (5GC) network, an evolved 5GC network or a 6G core network.

A communication device may be a user equipment (UE), an internet-of-thing (IoT) device, a mobile phone, a laptop, a tablet computer, an electronic book, a portable computer system, a vehicle, a ship or an aircraft. In addition, the network and the communication device can be seen as a transmitter or a receiver according to direction (i.e., transmission direction), e.g., for an uplink (UL), the communication device is the transmitter and the network is the receiver, and for a downlink (DL), the network is the transmitter and the communication device is the receiver.

Figure 2:
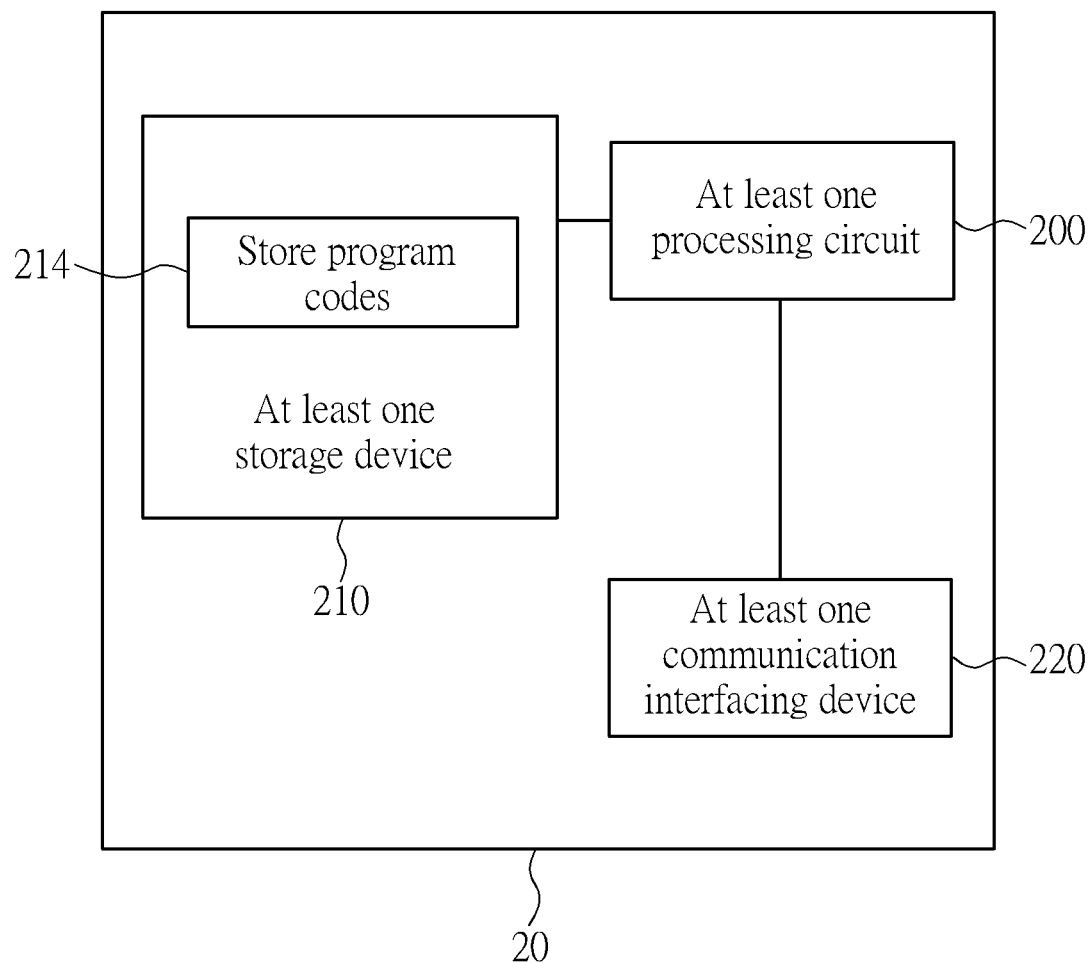
FIG. 2 is a schematic diagram of a communication device according to an example of the present invention.

In FIG. 2, a communication device 20 may be the communication device 100, the BS (s) 102 and/or 104 shown in FIG. 1, but is not limited herein. The communication device 20 includes at least one processing circuit 200 such as a microprocessor or Application Specific Integrated Circuit (ASIC), at least one storage device 210 and at least one communication interfacing device 220. The at least one storage device 210 may be any data storage device that may store program codes 214, accessed and executed by the at least one processing circuit 200. Examples of the at least one storage device 210 include but are not limited to a subscriber identity module (SIM), read-only memory (ROM), flash memory, random-access memory (RAM), hard disk, optical data storage device, non-volatile storage device, non-transitory computer-readable medium (e.g., tangible media), etc. The at least one communication interfacing device 220 is preferably at least one transceiver and is used to transmit and receive signals (e.g., data, messages and/or packets) according to processing results of the at least one processing circuit 200.

In the following examples, a UE/first UE/second UE/third UE is used for representing the communication device in FIG. 1, to simplify the illustration of the examples.

To camp on a cell, a UE in a new radio (NR) needs to search a cell at a carrier multiple times by using different subcarrier spacings (SCSs) given that the NR supports multiple SCSs. Consequently, the cell searching takes more time, and delays the UE to camp on a cell to get services.

Figure 3:
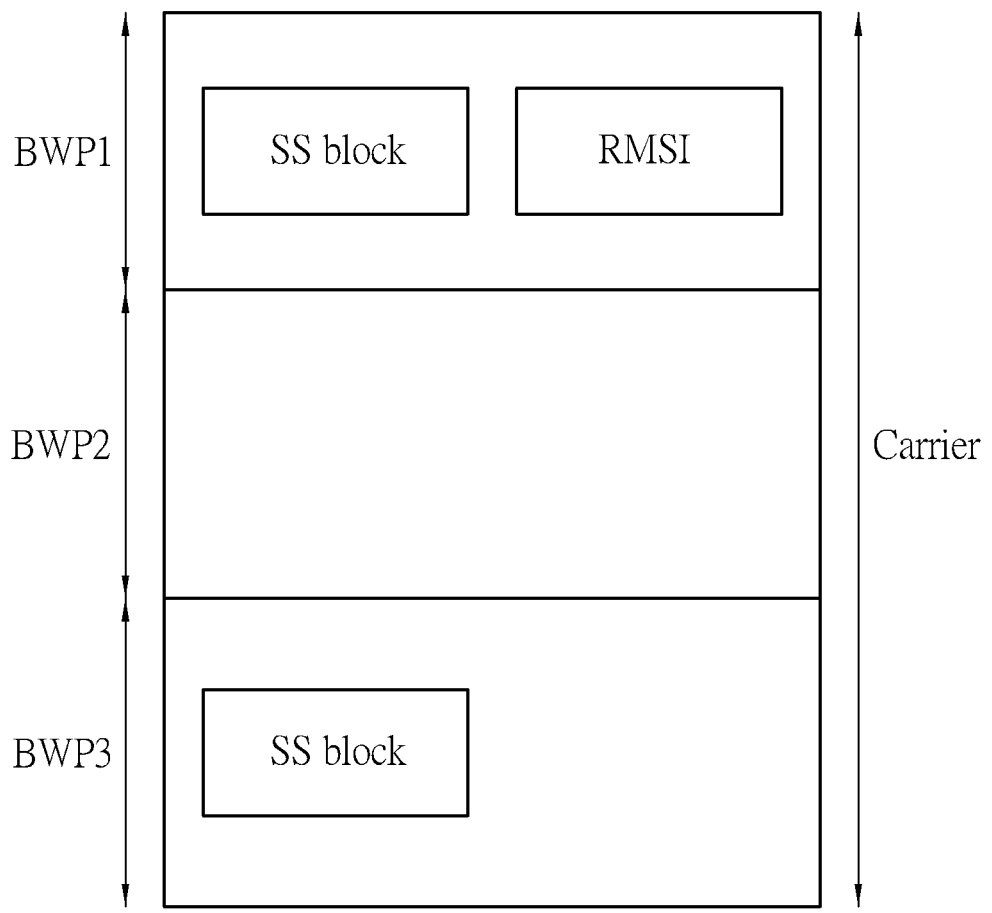
FIG. 3 is an example of BWPs according to an example of the present invention.

A subset of a total cell bandwidth of a cell of a BS is referred to as a Bandwidth Part (BWP). In FIG. 3, there are three types of BWPs belonging to a carrier (e.g., component carrier) and each of the three types may be used for a communication between a UE and the cell. The first type is illustrated by a BWP BWP1 which includes a synchronization signal block (SSB) and remaining system information (RMSI). The second type is illustrated by a BWP BWP2 which does not include the SSB and the RMSI. The third type is illustrated by a BWP BWP3 which includes the SSB but does not include the RMSI.

The SSB includes a primary SS (PSS), a secondary SS (SSS) and/or a physical broadcast channel (PBCH). The RMSI includes a system information block (SIB). A DL carrier has a single BWP (i.e., the whole DL carrier is a BWP), or has at least two BWPs of which each BWP belongs to one of the three types. A UL carrier has a single BWP (e.g., the UE is capable of transmitting on the whole bandwidth of the UL carrier, i.e., the whole UL carrier), or has at least two BWPs of which each BWP is the BWP BWP2. The DL carrier and the UL carrier may be the same carrier or different carriers.

Figure 4:
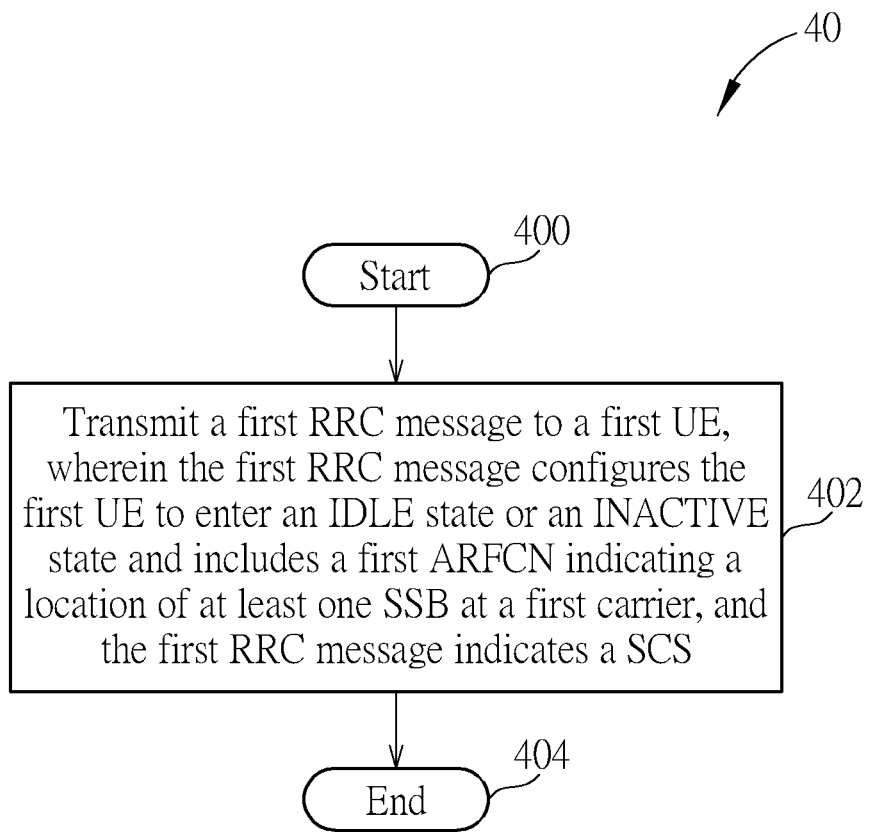
FIG. 4 is a flowchart of a process according to an example of the present invention.

A process 40 in FIG. 4 is utilized in a first BS (e.g., in the network in FIG. 1), and includes the following steps:

Step 400: Start.

Step 402: Transmit a first RRC message to a first UE, wherein the first RRC message configures the first UE to enter an IDLE state or an INACTIVE state and includes a first Absolute Radio Frequency Channel Number (ARFCN) indicating a location of at least one SSB at (e.g., within or on) a first carrier (i.e., a first carrier frequency), and the first RRC message indicates a subcarrier spacing (SCS).

Step 404: End.

Figure 5:
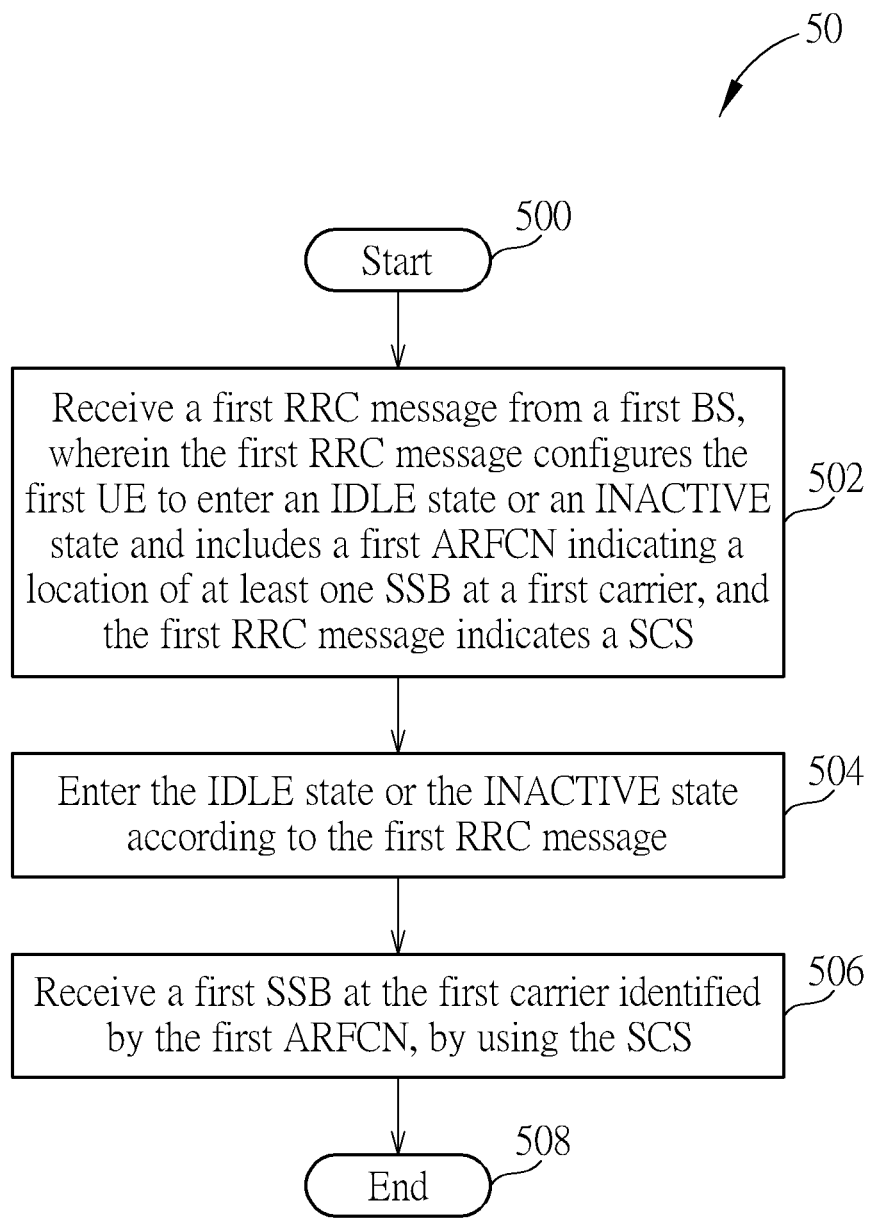
FIG. 5 is a flowchart of a process according to an example of the present invention.

A process 50 in FIG. 5 is utilized in a first UE, and includes the following steps:

Step 500: Start.

Step 502: Receive a first RRC message from a first BS, wherein the first RRC message configures the first UE to enter an IDLE state or an INACTIVE state and includes a first ARFCN indicating a location of at least one SSB at (e.g., within or on) a first carrier (i.e., a first carrier frequency), and the first RRC message indicates a SCS.

Step 504: Enter the IDLE state or the INACTIVE state according to the first RRC message.

Step 506: Receive a first SSB at (e.g., within or on) the first carrier identified by the first ARFCN, by using the SCS (i.e., according to the first RRC message).

Step 508: End.

According to the processes 40-50, the first BS transmits the first ARFCN and indication (or information) of the SCS (e.g., one of 15 KHz, 30 KHz, 60 KHz, 120 KHz, 240 KHz or 480 KHz) to the first UE, e.g., when the first UE in a RRC_CONNECTED state connects to the first BS. Accordingly, the first UE searches a first (e.g., suitable) cell at the first carrier by using the first ARFCN and the SCS. In details, the UE uses the first ARFCN to identify the first carrier and uses the SCS to receive the first SSB in the location (i.e., frequency location) at the first carrier at step 506, when the UE searches the first cell. Consequently, the UE can quickly find the first SSB of the first cell by using the first ARFCN and the SCS since the UE does not waste time to search a cell or to receive a SSB, by using another SCS different from the SCS and a wrong location at the first carrier.

In one example, if the first UE fails to find any suitable cell at the first carrier, the first UE searches any suitable cell in a different location at the first carrier or at any carrier different from the first carrier.

The following examples are applied to the processes 40-50. In the following description, "SSB(s)" is used for representing the at least one SSB at Steps 402 and 502 and the first SSB at Step 506. The at least one SSB may include the first SSB.

In one example, the first SSB is in a BWP of the first cell or the first carrier. The first cell may belong to the first BS or a third BS. The first BS or the third BS transmits (or broadcasts) the SSB(s) in the location on the first cell. The first BS may obtain (e.g., determine) which BWP at the first carrier is configured to the first UE according to characteristic(s) of a BWP. The characteristic(s) may include at least one of a SCS of the BWP, a bandwidth of the BWP, SSBs broadcasted, and/or essential SIB(s) broadcasted. The essential SIB(s) may include a SIB type 1 (SIB1) and/or a SIB type 2 (SIB2). For example, the first BS determines to configure the BWP, considering/when the SSB(s) and essential SIB(s) are broadcasted in the BWP (e.g., while the SSBs and/or the essential SIB(s) is/are not broadcasted in another BWP at the first carrier). Accordingly, the first BS determines the first ARFCN to indicate the location of the SSB(s) in the BWP.

In one example, the SSB(s) is a Cell-defining SSB. The SSB(s) may include a physical cell identity. In one example, the location of the SSB(s) is or is not at a center of the first carrier. In one example, the location of the SSB(s) is at a center frequency of the SSB(s), a bottom frequency of the SSB(s), or a top frequency of the SSB(s). In one example, the SSB(s) includes a PSS, a SSS and a PBCH or a master information block (MIB). The PBCH or the MIB does not indicate a bandwidth of the first carrier. In one example, the PSS and the SSS span 127 or 144 subcarriers. The PBCH may span 240 or 288 subcarriers. A RMSI associated to the SSB(s) and broadcast by the first BS or the third BS at the first carrier may not indicate the bandwidth of the first carrier.

In one example, the first UE retunes its radio frequency (RF) circuit (e.g., in the at least one communication interfacing device 220) to adapt to (or receive) a bandwidth of the SSB(s) (e.g., 240 or 288 subcarriers) to receive the SSB(s), in response to the first RRC message. The first UE may retune its RF circuit again to receive not only the SSB(s) but also the RMSI. In one example, the first UE (re)tunes its RF circuit to adapt to (or receive) a default, predetermined or maximum reception bandwidth greater than the bandwidth of the SSB(s). In this case, the UE receives the SSB(s), the RMSI and other system information (SI) without retuning its RF circuit. The other SI includes at least one SIB.

In one example, the first BS transmits a second RRC message to a second UE, e.g., when the second UE in the RRC_CONNECTED state connects to the first BS. The second RRC message configures the second UE to enter the IDLE state or the INACTIVE state. In one example, the second RRC message includes a second ARFCN indicating a center frequency of a second carrier (e.g., a second carrier frequency). In another example, the second RRC message does not include an (or any) ARFCN. In above examples, the first BS may not indicate a (or any) SCS in the second RRC message. The second UE enters the IDLE state or the INACTIVE state according to the second RRC message. The second UE searches a cell at the second carrier indicated by the second ARFCN, by using a default or predetermined SCS.

In one example, the first BS may transmit the first RRC message to the first UE, if the first UE supports NR. The first BS may transmit the second RRC message to the second UE, if the second UE does not support NR. The first BS may determine to include a SCS and an ARFCN in a RRC message (e.g., a RRC Connection Release or a RRC Release message) for a UE, if a UE supports NR. The first BS may determine not to include a SCS and an ARFCN in a RRC message (e.g., a RRC Connection Release or a RRC Release message) for a UE, if a UE does not support NR.

In one example, the first UE receives a third RRC message from a second BS, e.g., when the first UE connects to the second BS. The third RRC message configures the first UE to enter the IDLE state or the INACTIVE state. The third RRC message may or may not include a third ARFCN indicating a center carrier frequency of a third carrier (e.g., a third carrier frequency). The second BS may not indicate a SCS in the third RRC message. The first UE enters the IDLE state or the INACTIVE state according to the third RRC message. The third UE searches a cell at the third carrier indicated by the third ARFCN, if the third RRC message includes the third ARFCN. The first UE searches a cell at the third carrier indicated by the third ARFCN, by using a default or predetermined SCS. If the third RRC message does not include an ARFCN, the UE may search a cell at a carrier where the UE receives the third RRC message.

In one example, the second/third carrier has a bandwidth (e.g., 1.4, 3, 5, 10, 15 or 20 MHz, or 6, 15, 25, 50, 75 or 100 physical resource blocks (PRBs)). In one example, the second/third ARFCN does not indicate any location of SSB(s), but indicates locations of a PSS, a SSS and cell specific reference signals (CRSs). The second/first UE may synchronize to the PSS, the SSS and the CRSs according to second/third ARFCN. It should be noted that the first carrier may not have the CRSs, or the first ARFCN may not indicate the locations of the CRSs. The PSS and SSS may span 72 subcarriers. The CRSs may span the second/third carrier. In one example, the second/first UE retunes its RF circuit to adapt to (or receive) a bandwidth of the second/third carrier to receive the PSS, the SSS and/or the CRSs, in response to the second/third RRC message.

In one example, the first carrier belongs to (or is associated to) a first radio access technology (RAT), and the second/third carrier belongs to a second RAT. For example, the first RAT is a new radio (NR), and the second RAT is a Universal Terrestrial Radio Access (EUTRA) or an Evolved UTRA (EUTRA).

In one example, the first/second/third RRC message may be a first/second/third RRC Connection Release message or a first/second/third RRC Release message. The first/second BS may be a NR BS (e.g., gNB), an evolved NodeB (eNB), or a next generation (ng)-eNB.

In one example, the first/second UE communicates data (e.g., Medium Access Control (MAC) protocol data unit (PDU)) or control signals (e.g., a RRC message) with the first/second BS in a second cell, before receiving the first/second/third RRC message from the first/second BS. The first cell and the second cell may be the same or different.

In one example, the first/second UE receives a second SSB(s) on a fourth carrier frequency (e.g., of a fourth carrier) identified by a fourth ARFCN, before receiving the first/second/third RRC message from the first/second BS. The first/second UE may receive data (e.g., MAC PDU) in the fourth carrier frequency or in another carrier frequency associated to the second SSB(s), before receiving the first/second/third RRC message from the first/second BS.

In one example, the first/second UE receives a PSS, a SSS and a CRS on a fifth carrier frequency (e.g., of a fifth carrier) identified by a fifth ARFCN and receives the first/second/third RRC message from the first/second BS at the fifth carrier frequency. The first/second UE may receive data (e.g., MAC PDU) at the fifth carrier frequency, before receiving the first/second/third RRC message from the first/second BS.

In one example, the first SSB may include a PSS, a SSS and a MIB. The first UE derives a physical cell identity of the first cell from the PSS, the SSS or the first SSB. Then, the first UE acquires at least one SIB according to the MIB. When receiving the MIB and the at least one SIB, the first UE camps on the first cell. Then, the first UE may perform a RRC connection establishment procedure on the first cell for performing a registration procedure.

In one example, the first UE receives the PSS, the SSS and the CRS on the third carrier frequency identified by the third ARFCN. The first UE derives a physical cell identity of a third cell (e.g., the first cell) from the PSS and the SSS. Then, the UE acquires a MIB and a SIB type 1 (SIB1) at the third carrier in fixed locations at the third carrier. The UE may acquire a SIB type 2 (SIB2) according to the SIB1. When receiving the MIB, the SIB1 and the SIB2, the UE camps on the third cell (e.g., the first cell). Then, the UE may perform a RRC connection establishment procedure on the third cell (e.g., the first cell) for performing a Tracking Area Update (TAU) procedure or a registration procedure. The UE may obtain a bandwidth of the third carrier from the MIB.

In one example, the second/third RRC message does not include the second/third ARFCN.

In one example, the first BS communicates with the first/second UE at (e.g., within) a sixth carrier via the first or second cell, and transmits the first/second RRC message to the first/second UE at the sixth carrier via the first or second cell. The first BS may configure a RRC connection and/or a data radio bearer (DRB) to communicate data associated to the RRC connection and the DRB with the first/second UE at the sixth carrier. The first BS may communicate with the UE in a first BWP at the sixth carrier via the first or second cell.

In one example, the sixth carrier includes at least two BWPs, and the first BWP is one of the at least two BWPs. In one example, the first BS only transmits a control signal (e.g., Physical DL Control Channel (PDCCH)) and the data associated to the RRC connection and the DRB to the first UE in the first BWP. That is, only the first BWP is used by the first BS for communications between the first UE and the first BS. In one example, the first BS transmits the data to the first UE in the first BWP, and transmits a control signal in a second BWP or a third BWP of the at least two BWPs at the sixth carrier. In one example, the first BS transmits the control signal and the data to the first UE in the first BWP and one of the second BWP and the third BWP. A location (i.e., in a frequency domain) of the second BWP or the third BWP is different from a location of the first BWP. Locations of the at least two BWPs may or may not be overlapped.

In one example, the first UE in the IDLE state camps on a cell of the first BS or another BS in a fourth BWP at the sixth carrier before receiving the first RRC message. Then, the first UE performs a RRC procedure (e.g., RRC connection establishment procedure) via the cell of the first BS in the fourth BWP, to enter a CONNECTED state from the IDLE state. The first UE performs a RRC connection reconfiguration procedure (initiated by the first BS) with the first BS via the cell of the first BS in the fourth BWP. The first BS transmits a RRC Connection Reconfiguration message of the RRC connection reconfiguration procedure in the fourth BWP to the first UE, wherein the RRC Connection Reconfiguration message configures the first UE to communicate with the first BS in the first BWP at the sixth carrier. The first BS communicates with the first UE in the first BWP at the sixth carrier in response to/according to the RRC Connection Reconfiguration message. The first UE may transmit a RRC Connection Reconfiguration Complete message in response to the RRC Connection Reconfiguration message in the first BWP, the fourth BWP.

In one example, the first UE in the INACTIVE state camps on a cell of the first BS in the first BWP at the sixth carrier before receiving the first RRC message. Then, the first UE performs a RRC procedure (e.g., RRC connection resume procedure) via the cell of the first BS in the first BWP at the sixth carrier, to enter the CONNECTED state from the INACTIVE state. When the first UE receives a RRC message (e.g., RRC connection resume message) of the RRC procedure from the first BS in the first BWP, the first UE may resume communicating with the first BS in the first BWP.

In one example, when the first UE communicates with the first BS in the first BWP at the sixth carrier, the first UE receives Physical DL Shared Channel (PDSCH) transmissions from the first BS in the first BWP at the sixth carrier. Each of the PDSCH transmissions may include a MAC PDU. In one example, the first UE transmits Physical UL Shared Channel (PUSCH) transmissions to the first BS in the first BWP at the sixth carrier. Each of the PUSCH transmissions may include a MAC PDU.

In one example, if the first RRC message neither includes an ARFCN nor indicates a SCS, the first UE may search a cell at the sixth carrier by using a SCS which was used by the first UE to communicate with the first BS. In another example, if the first RRC message neither includes an ARFCN nor indicates a SCS, the first UE may camp on a cell on a second BWP at the sixth carrier by using a SCS which was used by the first UE to communicate with the first BS. In the above examples, the cell may or may not be a cell where the first UE receives the first RRC message. The first BWP and the second BWP may be the same or different.

It should be noted that although the above examples are illustrated to clarify the related operations of corresponding processes. The examples can be combined and/or modified arbitrarily according to system requirements and/or design considerations.

Those skilled in the art should readily make combinations, modifications and/or alterations on the abovementioned description and examples. The abovementioned description, steps and/or processes including suggested steps can be realized by means that could be hardware, software, firmware (known as a combination of a hardware device and computer instructions and data that reside as read-only software on the hardware device), an electronic system, or combination thereof. An example of the means may be the communication device 20. Any of the processes 40-50 may be compiled into the program codes 214.

To sum up, the present invention provides a method and related communication device for handling a RRC connection. The first BS transmits the first ARFCN and the SCS to the first UE. Accordingly, the first UE knows a location of SSB(s) at the first carrier and which SCS is used for the first carrier.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A base station (BS) for handling a radio resource control (RRC) connection, comprising:
    at least one storage device; and
    at least one processing circuit, coupled to the at least one storage device, wherein the at least one storage device stores instructions, and the at least one processing circuit is configured to execute the instructions comprising:
    transmitting a first RRC message to a first communication device, wherein the first RRC message configures the first communication device to enter an IDLE state or an INACTIVE state and comprises a first Absolute Radio Frequency Channel Number (ARFCN) indicating a location of at least one synchronization signal block (SSB) at a first carrier, and the first RRC message indicates a subcarrier spacing (SCS).

2. The BS of claim 1, wherein the first RRC message is a first RRC Connection Release message or a first RRC Release message.

3. The BS of claim 1, wherein the at least one processing circuit is configured to further execute the instructions comprising:
    transmitting a second RRC message to a second communication device, wherein the second RRC message configures the first communication device to enter an IDLE state or an INACTIVE state and does not indicate any SCS.

4. The BS of claim 3, wherein the second RRC message comprises a second ARFCN indicating a second carrier.

5. The BS of claim 3, wherein the second RRC message does not comprises any ARFCN.

6. The BS of claim 1, wherein the at least one processing circuit is configured to further execute the instructions comprising:
    transmitting the at least one SSB in the location.

7. The BS of claim 1, wherein the instructions comprising transmitting the first RRC message to the first communication device further comprising:
    transmitting the first RRC message to the first communication device at a third carrier.

8. A communication device for handling a radio resource control (RRC) connection, comprising:
    at least one storage device; and
    at least one processing circuit, coupled to the at least one storage device, wherein the at least one storage device stores instructions, and the at least one processing circuit is configured to execute the instructions comprising:
    receiving a RRC message from a first base station (BS), wherein the RRC message configures the communication device to enter an IDLE state or an INACTIVE state and comprises an Absolute Radio Frequency Channel Number (ARFCN) indicating a location of at least one synchronization signal block (SSB) at a first carrier, and the RRC message indicates a subcarrier spacing (SCS);
    entering the IDLE state or the INACTIVE state according to the RRC message; and
    receiving a SSB at the first carrier identified by the ARFCN, by using the SCS.

9. The communication device of claim 8, wherein the at least one processing circuit is configured to further execute the instructions comprising:
    searching any suitable cell in a different location at the first carrier or at any carrier different from the first carrier.

10. The communication device of claim 8, wherein the at least one processing circuit is configured to further execute the instructions comprising:

searching a cell at the first carrier by using the ARFCN and the SCS; and receiving the SSB in the location at the first carrier.

11. The communication device of claim 8, wherein the at least one processing circuit is configured to further execute the instructions comprising:

tuning a radio frequency (RF) circuit to adapt to a default, predetermined or maximum reception bandwidth greater than the bandwidth of the at least one SSB to receive the SSB, remaining system information and other system information.

12. The communication device of claim 8, wherein the at least one processing circuit is configured to further execute the instructions comprising:

receiving the RRC message at a second carrier.

* * * * *